US010161616B2

(12) United States Patent
Hsia

(10) Patent No.: US 10,161,616 B2
(45) Date of Patent: Dec. 25, 2018

(54) LINEAR SOLID-STATE LIGHTING WITH RELIABLE ELECTRIC SHOCK CURRENT CONTROL FREE OF FIRE HAZARD

(71) Applicant: Aleddra Inc., Renton, WA (US)

(72) Inventor: Chungho Hsia, Bellevue, WA (US)

(73) Assignee: ALEDDRA INC., Renton, WA (US)

( * ) Notice: Subject to any disclaimer, the term of this patent is extended or adjusted under 35 U.S.C. 154(b) by 0 days.

(21) Appl. No.: 15/897,106

(22) Filed: Feb. 14, 2018

(65) Prior Publication Data

US 2018/0187877 A1    Jul. 5, 2018

Related U.S. Application Data

(63) Continuation-in-part of application No. 15/874,752, filed on Jan. 18, 2018, now Pat. No. 10,036,515, which is a continuation-in-part of application No. 15/836,170, filed on Dec. 8, 2017, now Pat. No. 10,021,753, which is a continuation-in-part of application No. 15/649,392, filed on Jul. 13, 2017, now Pat. No. 9,986,619, which is a continuation-in-part of application No. 15/444,536, filed on Feb. 28, 2017, now Pat. No. 9,826,595, which is a continuation-in-part of application No.
(Continued)

(51) Int. Cl.
| | |
|---|---|
| *F21V 25/04* | (2006.01) |
| *F21K 9/278* | (2016.01) |
| *H05B 33/08* | (2006.01) |
| *F21V 23/00* | (2015.01) |

(52) U.S. Cl.
CPC ............. *F21V 25/04* (2013.01); *F21K 9/278* (2016.08); *F21V 23/003* (2013.01); *H05B 33/0809* (2013.01); *H05B 33/0887* (2013.01)

(58) Field of Classification Search
None
See application file for complete search history.

(56) References Cited

U.S. PATENT DOCUMENTS

| | | | | |
|---|---|---|---|---|
| 8,622,571 | B2* | 1/2014 | Hartikka | H05B 33/0803 362/221 |
| 2011/0260622 | A1* | 10/2011 | Hartikka | F21V 25/04 315/113 |
| 2012/0300445 | A1* | 11/2012 | Chu | F21V 25/04 362/217.13 |

* cited by examiner

*Primary Examiner* — Minh D A
*Assistant Examiner* — James H Cho
(74) *Attorney, Agent, or Firm* — Han IP PLLC; Andy M. Han

(57) ABSTRACT

A linear light-emitting diode (LED) lamp comprising a housing, two lamp bases at two ends of the housing, a full-wave rectifier, an LED driving circuit, LED arrays, two displacement sensors, and two pairs of electrical contacts controlled by the two displacement sensors, is used to replace a fluorescent tube or a conventional LED tube lamp. The two displacement sensors and the two pairs of electrical contacts are configured to respectively perform position sensing for electric shock hazards. The two pairs of electrical contacts are operated by using a low direct current (DC) voltage supplied by a power sustaining device. When both two lamp bases are inserted in the two sockets, the two pairs of electrical contacts are driven to make an electric connection from the power sustaining device to a low voltage input of the LED driving circuit and to power the LED driving circuit. Use of the low DC voltage is to eliminate electric arcing that may cause internal fire when used with ballasts and to prevent substantial electric shock current from reaching ground through a person's body when used with AC mains.

8 Claims, 4 Drawing Sheets

Related U.S. Application Data

15/362,772, filed on Nov. 28, 2016, now Pat. No. 9,967,927, which is a continuation-in-part of application No. 15/225,748, filed on Aug. 1, 2016, now Pat. No. 9,743,484, which is a continuation-in-part of application No. 14/818,041, filed on Aug. 4, 2015, now Pat. No. 9,420,663, which is a continuation-in-part of application No. 14/688,841, filed on Apr. 16, 2015, now Pat. No. 9,288,867, which is a continuation-in-part of application No. 14/465,174, filed on Aug. 21, 2014, now Pat. No. 9,277,603, which is a continuation-in-part of application No. 14/135,116, filed on Dec. 19, 2013, now Pat. No. 9,163,818, which is a continuation-in-part of application No. 13/525,249, filed on Jun. 15, 2012, now Pat. No. 8,749,167.

LINEAR SOLID-STATE LIGHTING WITH RELIABLE ELECTRIC SHOCK CURRENT CONTROL FREE OF FIRE HAZARD

CROSS-REFERENCE TO RELATED APPLICATIONS

The present disclosure is part of a continuation-in-part (CIP) application of U.S. patent application Ser. No. 15/874,752, filed 18 Jan. 2018 and issued as U.S. Pat. No. 10,036,515 on 31 Jul. 2018, which is a CIP application of U.S. patent application Ser. No. 15/836,170, filed 8 Dec. 2017 and issued as U.S. Pat. No. 10,021,753 on 10 Jul. 2018, which is a CIP application of U.S. patent application of Ser. No. 15/649,392 filed 13 Jul. 2017 and issued as U.S. Pat. No. 9,986,619 on 29 May 2018, which is a CIP application of U.S. patent application Ser. No. 15/444,536, filed 28 Feb. 2017 and issued as U.S. Pat. No. 9,826,595 on 21 Nov. 2017, which is a CIP application of U.S. patent application Ser. No. 15/362,772, filed 28 Nov. 2016 and issued as U.S. Pat. No. 9,967,927 on 8 May 2018, which is a CIP application of U.S. patent application Ser. No. 15/225,748, filed 1 Aug. 2016 and issued as U.S. Pat. No. 9,743,484 on 22 Aug. 2017, which is a CIP application of U.S. patent application Ser. No. 14/818,041, filed 4 Aug. 2015 and issued as U.S. Pat. No. 9,420,663 on 16 Aug. 2016, which is a CIP application of U.S. patent application Ser. No. 14/688,841, filed 16 Apr. 2015 and issued as U.S. Pat. No. 9,288,867 on 15 Mar. 2016, which is a CIP application of U.S. patent application Ser. No. 14/465,174, filed 21 Aug. 2014 and issued as U.S. Pat. No. 9,277,603 on 1 Mar. 2016, which is a CIP application of U.S. patent application Ser. No. 14/135,116, filed 19 Dec. 2013 and issued as U.S. Pat. No. 9,163,818 on 20 Oct. 2015, which is a CIP application of U.S. patent application Ser. No. 13/525,249, filed 15 Jun. 2012 and issued as U.S. Pat. No. 8,749,167 on 10 Jun. 2014. Contents of the above-identified applications are incorporated herein by reference in their entirety.

BACKGROUND

Technical Field

The present disclosure relates to linear light-emitting diode (LED) lamps and more particularly to a linear LED lamp with reliable low-voltage control for electric shock hazard, configured to eliminate electric arcing that may cause internal fire when used with ballasts and to prevent electric shock current from reaching ground through a person's body when used with AC mains.

Description of the Related Art

Solid-state lighting from semiconductor light-emitting diodes (LEDs) has received much attention in general lighting applications today. Because of its potential for more energy savings, better environmental protection (no hazardous materials used), higher efficiency, smaller size, and much longer lifetime than conventional incandescent bulbs and fluorescent tubes, the LED-based solid-state lighting will be a mainstream for general lighting in the near future. As LED technologies develop with the drive for energy efficiency and clean technologies worldwide, more families and organizations will adopt LED lighting for their illumination applications. In this trend, the potential safety concerns such as risk of electric shock and fire become especially important and need to be well addressed.

In today's retrofit application of a linear LED tube (LLT) lamp to replace an existing fluorescent tube, consumers may choose either to adopt a ballast-compatible LLT lamp with an existing ballast to operate the fluorescent tube or to employ an AC mains-operable LED lamp by removing/bypassing the ballast. Either application has its advantages and disadvantages. In the former case, although the ballast consumes extra power, it is straightforward to replace the fluorescent tube without rewiring, which consumers may have a first impression that it is the best alternative to fluorescent tube lamps. But the fact is that total cost of ownership for this approach is high regardless of very low initial cost. For example, the ballast-compatible LLT lamps work only with particular types of ballasts. If the existing ballast is not compatible with the ballast-compatible LLT lamp, the consumers will have to replace the ballast. Some facilities built long time ago incorporate different types of fixtures, which requires extensive labor for both identifying ballasts and replacing incompatible ones. Moreover, a ballast-compatible LLT lamp can operate longer than the ballast. When an old ballast fails, a new ballast will be needed to replace in order to keep the ballast-compatible LLT lamps working. Maintenance will be complicated, sometimes for lamps and sometimes for ballasts. The incurred cost will preponderate over the initial cost savings by changeover to the ballast-compatible LLT lamps for hundreds of fixtures throughout a facility. When the ballast in a fixture dies, all the ballast-compatible tube lamps in the fixture go out until the ballast is replaced. In addition, replacing a failed ballast requires a certified electrician. The labor costs and long-term maintenance costs will be unacceptable to end users. From energy saving point of view, a ballast constantly draws power, even when the ballast-compatible LLT lamps are dead or not installed. In this sense, any energy saved while using the ballast-compatible LLT lamps becomes meaningless with the constant energy use by the ballast. In the long run, ballast-compatible LLT lamps are more expensive and less efficient than self-sustaining AC mains-operable LLT lamps.

On the contrary, an AC mains-operable LLT lamp does not require a ballast to operate. Before use of an AC mains-operable LLT lamp, the ballast in a fixture must be removed or bypassed. Removing or bypassing the ballast does not require an electrician and can be replaced by end users. Each AC mains-operable LLT lamp is self-sustaining. If one AC mains-operable tube lamp in a fixture goes out, other lamps in the fixture are not affected. Once installed, the AC mains-operable LLT lamps will only need to be replaced after 50,000 hours. In view of above advantages and disadvantages of both ballast-compatible LLT lamps and AC mains-operable LLT lamps, it seems that market needs a most cost-effective solution by using a universal LLT lamp that can be used with the AC mains and is compatible with a ballast so that LLT lamp users can save an initial cost by changeover to such a universal LLT lamp followed by retrofitting the lamp fixture to be used with the AC mains when the ballast dies.

In the U.S. patent application Ser. No. 14/688,841, filed Apr. 16, 2015, two shock prevention switches and an all-in-one driving circuit are adopted in an LLT lamp such that AC power from either a ballast or the AC mains can operate the LLT lamp without operational uncertainty and electric shock hazards. In other words, no matter what a lamp fixture is configured as the AC mains- or a ballast-compatible fashion, the LLT lamp automatically detects configurations and works for either one. All of such LLT lamps, no matter whether AC mains-operable or ballast-compatible, are electrically wired as double-ended and have one construction issue related to product safety and needed to be resolved prior to wide field deployment. This kind of LLT lamps, if no shock prevention scheme is adopted in, always fails a safety test, which measures a through-lamp electric shock current. Because an AC-mains voltage applies to both opposite ends of the LLT lamps, the measurement of current leakage from one end to the other consistently results in a substantial current flow, which may present a risk of an electric shock during re-lamping. Due to this potential shock risk to the person who replaces the LLT lamps in an existing fluorescent tube fixture, Underwriters Laboratories (UL) uses its safety standard, UL 935, Risk of Shock During Relamping (Through Lamp), to do a current leakage test and to determine if the LLT lamps meet the consumer safety requirement. Although the LLT lamps used with a ballast can pass the current leakage test, some kinds of electric shock hazards do exist. Experimental results show that the skin of the person who touches an exposed bi-pin may be burned due to such an electric shock. Fortunately, a mechanism of double shock prevention switches used in applications with the AC mains is also effective in applications with the ballasts to prevent the electric shock from occurring, thus protecting consumers from such a hazard, no matter whether input voltage is from the AC mains or the ballast. Therefore, a universal LLT lamp that can work with either the AC mains or the ballast makes sense. The effectiveness of using double shock prevention switches for applications in the AC mains has been well addressed in U.S. Pat. No. 8,147,091, issued on Apr. 3, 2012. However, a conventional shock prevention switch has an inherent issue related to an electric arc when operated with a ballast. Unlike an AC voltage of 120 or 277 V/50-60 Hz from the AC mains, the output AC voltage and current from the ballast presents a negative resistance characteristic. The feature that originally supports a fluorescent tube to function properly becomes extremely detrimental to the conventional shock prevention switch due to the electric arc likely occurring between two electrical contacts that have a high electrical potential difference with a high frequency, such as 600 V/50 kHz. Once a consumer fails to follow installation instructions to install or uninstall linear LED tube lamps such that one of two ends of the tube lamp is in the fixture socket connected to a powered ballast, and the other end is tweaked to connect to or disconnect from the associated socket, an internal electric arcing may occur between the electrical contacts in the associated switch. The arcing even in a short period such as several seconds can generate high heat, burning and melting electrical contacts and neighboring plastic enclosures, creating a fire hazard. The AC voltage of 120 or 277 V/50~60 Hz from the AC mains does not have such an issue because its voltage is relatively low compared with the ballast output voltage of 600 V. Moreover, the AC frequency of 60 Hz automatically extinguishes an electric arc every 1/60 seconds, if existed. That is why a utility switch can be used in an electrical appliance to turn power on and off without any problem. However when used with the ballast, the electrical contacts used in the conventional shock prevention switch can easily be burned out due to the high-voltage and high-frequency arcing introduced between each gap of each pair of the electrical contacts in the conventional shock prevention switch when someone tries to abusively tweak to remove the tube lamp from the fixture with the ballast that has a power on it. Although such a situation is rare, an internal arcing, if occurred, does cause burning and even welding of the electrical contacts and melting of the plastic enclosure, so called internal fire, creating consumer safety issues.

Today, such LLT lamps are mostly used in a ceiling light fixture with a wall-mount power switch. The ceiling light fixture could be an existing one used with fluorescent tubes but retrofitted for LLT lamps or a specific LLT lamp fixture. The drivers that provide a proper voltage and current to LED arrays could be internal or external ones. Not like LLT lamps with an external driver that is inherently electric-shock free if the driver can pass a dielectric withstand test used in the industry, LLT lamps with an internal driver could have a shock hazard during relamping or maintenance, when the substantial through-lamp electric shock current flows from any one of AC voltage inputs through the internal driver connecting to LED arrays to the earth ground. Despite this disadvantage, LLT lamps with the internal driver still receive wide acceptance because they provide a stand-alone functionality and an easy retrofit for an LLT lamp fixture. As consumerism develops, consumer product safety becomes extremely important. Any products with electric shock or fire hazards and risk of injuries or deaths are absolutely not acceptable for consumers. However, commercially available LLT lamps with internal drivers, single-ended or double-ended, fail to provide effective solutions to the problems of possible electric shock and internal arcing and fire.

In the prior art mentioned above, the double shock protection switches with mechanical actuation mechanisms protruding outwards from both ends of the LLT lamp are proposed to control a line voltage from the AC mains or high voltages from the ballasts to connect to the LLT lamp. However, a length control of the LLT lamp becomes critical to operate the LLT lamp because sometimes the double shock protection switches may not be actuated by the mechanical actuation mechanisms. Also, the double shock protection switches directly control AC voltages such as 120 or 277 V/50~60 Hz from the AC mains or 600 V/45~65 kHz from the ballasts, which makes the conventional LLT lamp so vulnerable because such high voltages working on the double shock protection switches may easily cause internal fire if consumers abusively tweak the mechanical actuation mechanisms at both ends of the LLT lamp operable with a ballast during relamping. Another prior art may adopt an electronic approach to eliminating electric shock. However, such an electronic approach may not be as reliable as expected, especially in real applications where the electronic approach continues to fail in electric shock and arcing situations. It is, therefore, the purpose of the present disclosure to disclose a novel low-voltage control approach to be used in the LLT lamp to eliminate above-mentioned electric shock and internal fire hazards and to work more reliably to protect consumers.

SUMMARY

A linear light-emitting diode (LED) tube (LLT) lamp comprising a housing, two lamp bases at two ends of the housing, a full-wave rectifier, an LED driving circuit, one or more LED arrays, at least two displacement sensors, at least one conductor protruding outwards from each lamp base, and at least two pairs of electrical contacts controlled by the at least two displacement sensors, is used to replace a fluorescent tube or a conventional LED tube lamp without the at least two displacement sensors and the at least two pairs of electrical contacts. The at least two displacement sensors and the at least two pairs of electrical contacts are configured to respectively perform position sensing between the two lamp bases and two sockets in an existing lamp fixture. When both two lamp bases are inserted in the two sockets, the at least two pairs of electrical contacts are driven by the at least two displacement sensors to make an electrical connection between the full-wave rectifier and the LED driving circuit, rather than between an alternate current (AC) voltage input and the full-wave rectifier, to power the LED driving circuit and the one or more LED arrays. When either one of the at least one conductor in the two lamp bases is not inserted in one of the two sockets, the at least two pairs of electrical contacts are disabled so as to disconnect a direct current (DC) current flow from the full-wave rectifier to the LED driving circuit. Without such DC current flowing to power the LED driving circuit, a substantial through-lamp electric shock current is considered not to exist. Furthermore, the at least two pairs of electrical contacts are interconnected between the full-wave rectifier and the LED driving circuit, the DC voltage provided to the LED driving circuit can be made small by using a voltage divider. In such a case, no high voltage at a high frequency from a ballast is present at any open/closed electrical contacts in the LLT lamp, thus no internal fire possible. The scheme can effectively reduce a risk of electric shock and a fire hazard to users during relamping or maintenance.

In one embodiment, the LED driving circuit may comprise an input filter, one or more start-up resistors, a power sustaining device, and a driver enabled by the power sustaining device to power the one or more LED arrays. When both two lamp bases of the LLT lamp are in the two fixture sockets, there is no exposed at least one conductor that installers can possibly touch, creating an electric shock hazard. In this case, both the at least two pairs of electrical contacts are electrically connected by actuation of displacement sensors, whereas a low DC voltage is applied to the power sustaining device, controlling electric current to flow into the driver, further operating the one or more LED arrays. However, when either one of the two lamp bases of the LLT lamp is not in the respective socket, the electric shock hazard occurs. In this case, the respective one of the at least two displacement sensors associated with the exposed lamp base is not actuated with respective one of the at least two pairs of electrical contacts not electrically connected. Because the at least two pairs of electrical contacts are interconnected before connecting between the power sustaining device and the driver, the low DC voltage supplied from the power sustaining device is unable to reach a low voltage input of the driver, thus disabling operation of the LED driving circuit. No substantial electric shock current can possibly be leaked out of the exposed at least one electrical conductor when the LLT lamp is first inserted in the fixture sockets to operate.

In another embodiment, the LED driving circuit may further comprise a voltage feedback module connected in parallel with the one or more start-up resistors to pour energy in the power sustaining device, consequently sustaining operation of the LED driving circuit and the one or more LED arrays. During maintenance, the LLT lamp is already operated while an installer tries to remove one lamp base out of respective one of the fixture sockets, the installer may get the electric shock if she or he touches the exposed at least one conductor protruding from the respective lamp base since each of the installer's fingers is an electrically-conductive object. The reason is that once the LED driving circuit in the LLT lamp is operated, a continuous operation of the LED driving circuit may or may not solely depend on the low DC voltage applied to the driver from the one or more start-up resistors. In fact, the driver may also be powered by an output voltage built up to operate the one or more LED arrays after a system start-up via the voltage feedback module. As long as the LED driving circuit operates, an electric shock hazard exists. In order to completely remove such occurrence to protect installers from getting electric shock, both the low input DC voltage from the one or more start-up resistors and a low DC voltage extracted from the output voltage via the voltage feedback module must simultaneously be disconnected from the power sustaining device. In this embodiment, the driver may further comprise an electrical jumper pair connected to the at least one pair of electrical contacts in each of the two lamp bases, connected in series. The electrical jumper pair is further connected between a combination of the one or more start-up resistors and the voltage feedback module and the low voltage input of the driver. The use of the low DC voltage from both input and output in controlling electrical contacts to be on or off has one of unique advantages. That is, no matter whether AC sources is AC mains from an electrical grid or power supplies from various ballasts, no electric arcing can possibly occur due to a low DC current associated with the low DC voltage. In other words, an internal arcing and firing will never occur using this approach, thus eliminating any internal fire hazard and enhancing operation reliability.

BRIEF DESCRIPTION OF THE DRAWINGS

Non-limiting and non-exhaustive embodiments of the present disclosure are described with reference to the following figures, wherein like reference numerals refer to like parts throughout the various figures unless otherwise specified.

DETAILED DESCRIPTION OF THE INVENTION

Figure 1:
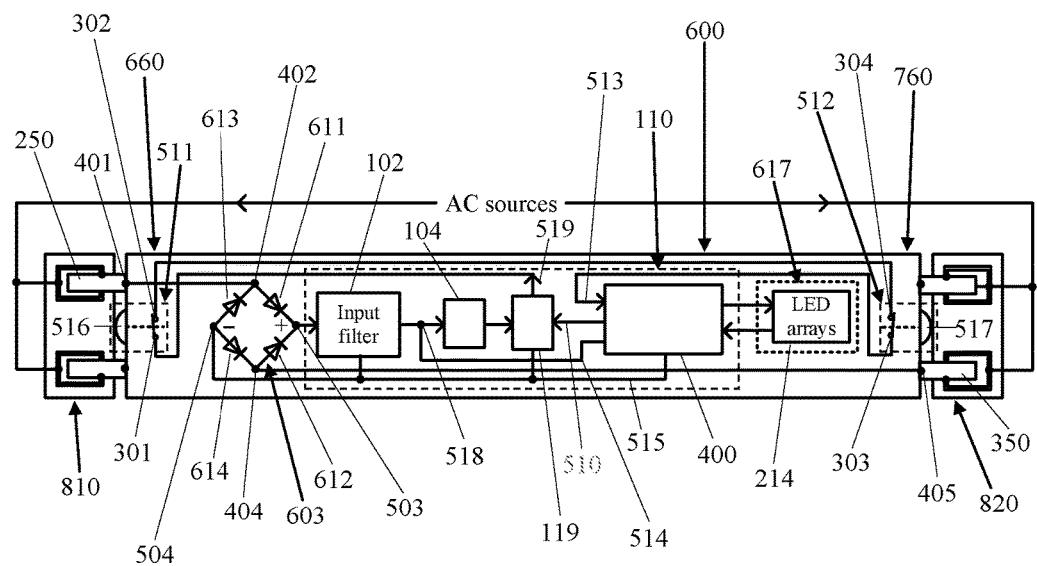
FIG. 1 is one embodiment of a linear LED tube (LLT) lamp installed in lamp fixture sockets connected with AC sources that include AC mains and ballasts according to the present disclosure.

FIG. 1 is one embodiment of a linear LED tube (LLT) lamp installed in lamp fixture sockets connected with AC sources that include AC mains and ballasts according to the present disclosure. The LLT lamp 600 comprises a housing having two ends; two lamp bases 660 and 760 each having at least one electrical conductor 250 and 350 at each end of the housing; a first displacement sensor pair 511 close to the lamp base 660 comprising a displacement sensor 516 and a first pair of electrical contacts 301 and 302; a second displacement sensor pair 512 close to the lamp base 760 comprising a displacement sensor 517 and a second pair of electrical contacts 303 and 304; a full-wave rectifier 603 comprising diodes 611, 612, 613, and 614 interconnected at ports 402, 404, 503, and 504; an LED driving circuit 110; and one or more LED arrays 214 disposed on an LED PCB 617 with the one or more LED arrays 214 connected to the LED driving circuit 110. The LED driving circuit 110 comprises an input filter 102 connected to the port 503 of the full-wave rectifier 603, one or more start-up resistors 104 connected to the input filter 102, a driver 400 connected to the one or more LED arrays 214, and a power sustaining device 119 connected between the one or more start-up resistors 104 and the driver 400. The driver 400 comprises a low voltage input 513, a high voltage input 514 connected to a port 518 of the input filter 102, a low voltage output 510 connected to the power sustaining device 119, and a common port 515 connected to the port 504 of the full-wave rectifier 603. The first and the second pairs of electrical contacts 301, 302, 303, and 304 are interconnected in series and further connected between the power sustaining device 119 and the driver 400. The power sustaining device 119 receives a first low DC voltage from the one or more start-up resistors 104 and a second low DC voltage from the driver 400, sends a third low DC voltage via a connecting port 519 connected to the first and the second pairs of electrical contacts 301, 302, 303, and 304, and loops to the low voltage input 513 of the driver 400. The high voltage input 514 is configured to connect to a Buck converter 200 (in FIGS. 2-4), whereas the low voltage input 513 is configured to provide the driver 400 with sustaining power to operate the Buck converter, further controlling a proper current and voltage to drive the one or more LED arrays 214. In FIG. 1, the full-wave rectifier 603 is always connected to the at least one electrical conductor 250 and the at least one electrical conductor 350 and receives AC power from the AC mains or the ballasts. This is different from prior art, which uses double safety switches to make connections between the at least one electrical conductors 250 and 350 and the full-wave rectifier 603. In FIG. 1, the LED driving circuit 110 directly connects to the full-wave rectifier 603, receiving the DC voltage V+ from the port 503. When the first and the second pairs of electrical contacts 301, 302, 303, and 304 are not individually electrically connected, the power sustaining device 119 is not connected to the low voltage input 513 of the driver 400, thus disabling the driver 400 to power one or more LED arrays 214. Without electric current returned from one or more LED arrays 214 to reach an exposed at least one electrical conductor 250 or 350, no electric shock hazard will occur even though the at least one electrical conductor 250 and the at least one electrical conductor 350 are electrically connected with the full-wave rectifier 603, which energizes the LED driving circuit 110.

When both the at least one electrical conductor 250 and the at least one electrical conductor 350 in each lamp base are respectively inserted into the lamp fixture sockets 810 and 820, the displacement sensor pairs 511 and 512 individually actuate the first and the second pairs of electrical contacts 301, 302, 303, and 304 in a way that an electric current can conduct between the first pair of electrical contacts 301 and 302 and between the second pair of electrical contacts 303 and 304. The electric current can flow from the port 519 of the power sustaining device 119, the first pair of electrical contacts 301 and 302, the second pair of electrical contacts 303 and 304, entering the low voltage input port 513 of the driver 400. During system start-up, the electric current from one port of the AC sources can flow from the electrical contact 401 of the at least one electrical conductor 250, the full-wave rectifier 603 through the diode 611 to the port 503 of the LED driving circuit 110, going through the input filter 102. When the first low DC voltage from the one or more start-up resistors 104 is applied to the power sustaining device 119, an electric current exiting from the port 509 of the power sustaining device 119, passing through the first pair of electrical contacts 301 and 302 and the second pair of electrical contacts 303 and 304 flows into the low voltage input port 513 of the driver 400. Whereas the high voltage input port 514 of the driver 400 is already energized, the first low DC voltage from the one or more start-up resistors 104 starts to operate the driver 400, powering the one or more LED arrays 214. The current returns to the common port 515 of the driver 400, continuing to flow through the diode 614 of the full-wave rectifier 603, the electrical contact 405 of the at least one electrical conductor 350 to the other port of the AC sources, completing the positive half cycle power transfer. Once the driver 400 is operated, it extracts partial power from the output voltage to pour into the power sustaining device 119 to maintain its operation while the first low DC voltage from the one or more start-up resistors 104 continuously applies to the power sustaining device 119. It is, therefore, more effective to shut off the driver 400 by cutting off these two power sources together rather than cutting off only the first low DC voltage from the one or more start-up resistors 104 when an electric shock hazard occurs. For a negative half cycle, the electric current from one port of the AC sources can flow from the electrical contact 405 of the at least one electrical conductor 350, the full-wave rectifier 603 through the diode 612 to the port 503 of the LED driving circuit 110. Similar to the current flow in the LED driving circuit 110 for positive cycle, the electric current continues to flow through the diode 613 of the full-wave rectifier 603, the electrical contact 401 of the at least one electrical conductor 250 to the other port of the AC sources, completing the negative half cycle power transfer.

When the lamp base 660 is inserted in the lamp socket 810, which connects to one port of the AC sources (say, the left side in FIG. 1), the LLT lamp 600 is energized. If the first and the second pairs of electrical contacts 301, 302, 303, and 304 do not exist to control the electric current conduction, a substantial through-lamp electric shock current from the LED driving circuit 110 and the one or more LED arrays 214 can always come out through the at least one electrical conductor 350, which may be exposed to a user for an electric shock. The electric shock may be fatal depending on impedance between the user's body and the earth ground. On the other hand, if the first and the second pairs of electrical contacts 301, 302, 303, and 304 exist and are connected in series and looped between the power sustaining device 119 and the driver 400, then the through-lamp electric shock current from the LED driving circuit 110 and the one or more LED arrays 214 can be set to zero. However, a small amount of the through-lamp electric shock current will come out from the input filter 102 and some varistors and capacitors (not shown in FIG. 1) for safety in front of the full-wave rectifier 603. Because such a load is a fraction of the load from the one or more LED arrays 214, its through-lamp electric shock current can be controlled to an acceptable level not exceeding a specific value defined in the safety standard UL 935, no fatal electric shock possible. In a normal operation when the at least one electrical conductor 250 and the at least one electrical conductor 350 are connected to the AC mains or the ballasts in a double-ended wiring lamp fixture, the LED driving circuit 110 can receive power to drive the one or more LED arrays 214. As can be seen in FIG. 1, two sockets in each of the external fixture lamp sockets 810 and 820 are shunted, meaning that as long as the at least one electrical conductor 250 in the lamp base 660 and the at least one electrical conductor 350 in the lamp base 760 are connected to the AC sources, the LLT lamp adopting the approach depicted in FIG. 1 can operate with an acceptable through-lamp electric shock current, which is deemed safe for users.

Figure 2:
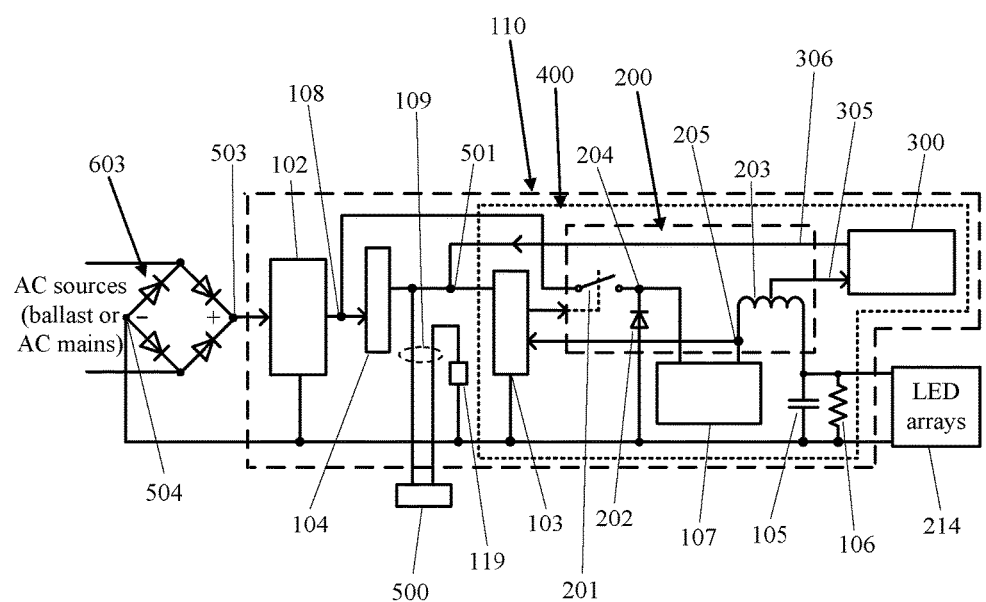
FIG. 2 is one embodiment of an LED driving circuit used in an LLT lamp operable with either the AC mains or ballasts according to the present disclosure.

FIG. 2 is one embodiment of an LED driving circuit used in an LLT lamp operable with either the AC mains or the ballasts according to the present disclosure. In FIG. 2, the same numerals are used for the same components as in FIG. 1. A full-wave rectifier 603 connecting to an AC source, either the AC mains or the ballast, converts an AC voltage into a DC voltage. An LED driving circuit 110, connecting to the full-wave rectifier 603, comprises an input filter 102 used to filter the input voltage and to suppress EMI noise created in the LED driving circuit 110, one or more start-up resistors 104, a power sustaining device 119, a driver 400, an electrical jumper pair 109 connecting between the power sustaining device 119 and the driver 400 with a terminal module 500 outside the LED driving circuit 110. The driver 400 comprises a power factor correction (PFC) and control device 103, a Buck converter 200 in communicating with the PFC and control device 103, an output capacitor 105 in parallel with a resistor 106 connected to the Buck converter 200 to build up an output voltage and to power the one or more LED arrays 214, a current sensing resistor 107, and a voltage feedback module 300 extracting partial energy from the output voltage to sustain the PFC and control device 103. The driver 400 has a high voltage input port 108 and a low voltage input port 501. The terminal module 500 comprises the first pair of electrical contacts 301 and 302 and the second pair of electrical contacts 303 and 304 interconnected in series, as depicted in FIG. 1. Either one of the two pairs of electrical contacts not electrically connected results in a missing connection between the power sustaining device 119 and the low voltage input port 501. The power sustaining device 119 is configured to provide a low DC voltage operating the PFC and control device 103. When such a missing connection occurs, the PFC and control device 103 does not work, neither the driver 400. The full-wave rectifier 603 has four input/output ports, among which a high electric potential appears at the input/output port 503 as V+, and a low electric potential appears at the input/output port 504 as V−, respectively connecting to the high side and the low side of the input filter 102 with the low electric potential port 504 as a common ground. The Buck converter 200 comprises a switch 201 controlled by the PFC and control device 103, a diode 202, and an inductor 203 with its current charging and discharging controlled by the switch 201. When both two pairs of electrical contacts in the terminal module 500 are individually connected, the electrical jumper pair 109 connecting to the terminal module 500 conducts so that the low DC voltage from the power sustaining device 119 applies to the PFC and control device 103 to sustain its operation. Then the driver 400 can detect zero current in the inductor 203 within an AC cycle of an input voltage generating a zero current detection signal and controls the switch 201 on and off with a constant on-time and a varied off-time controlled by the zero current detection signal. By adapting switching frequencies for a high frequency associated with a ballast and a low frequency associated with the AC mains, the PFC and control device 103 controls the switch 201 on and off in a way that the inductor 203 is charged during on-time and discharged during off-time, and that a desired output voltage $V_o$ across the one or more LED arrays 214 is reached to light up the one or more LED arrays 214. The average inductor current is thus equal to the output current that flows into the LED array 214. When the switch 201 is on, the diode 202 is reverse-biased, and an input current flows from an output port 108 in the input filter 102, the switch 201, the first port 204 of the current sensing resistor 107, the current sensing resistor 107 itself, and the second port 205 of the current sensing resistor 107, into the inductor 203. When the current flowing into the inductor 203 increases, the voltage across the current sensing resistor 107 increases. The second port 205 of the current sensing resistor 107 connects with the PFC and control device 103, which continuously receives signals and adjusts the off-time such that the output voltage and current to the one or more LED arrays 214 are regulated to meet the output requirements. The output capacitor 105 in parallel with the resistor 106 connects to the inductor 203, receiving energy to build up an output voltage and to power the one or more LED arrays 214.

The inductor 203 configured as an autotransformer has a center-tapped port connecting to the voltage feedback module 300 comprising a diode. The voltage feedback module 300 has two connection ports 305 and 306, with the first connection port 305 connecting to the center-tapped port of center-tapped inductor 203 and with the second connection port 306 connecting to the PFC and control device 103. The PFC and control device 103 is powered by the power sustaining device 119 with a voltage built up to supply an internal logic control circuit (not shown) in the PFC and control device 103. When the voltage decreases due to its increased internal operations and controls, and when the voltage at the center-tapped port of the inductor 203 is higher than the supplying voltage, the diode in the voltage feedback module 300 conducts to supply a current to the PFC and control device 103 and sustain its operations. The function of the voltage feedback module 300 is essential because the LED driving circuit 110 has a wide range of operating voltages not only 110 and 277 VAC for AC mains but also 375~600 VAC for a ballast. The one or more start-up resistor 104 is so designed to operate a LLT lamp at the lowest input voltage 110 VAC. When the highest voltage 600 VAC from the ballast comes in, a higher proportional voltage appears at an input of the internal logic control circuit. Therefore an operating voltage for the internal logic control circuit must be in a wide range such as 11~35 VDC rather than 5~15 VDC as in a conventional logic control device. To meet requirements of start-up time and current without turn-on failure or flickering occurred at the lamp start-up, the power sustaining device 119 must be used at the input of the internal logic control circuit. The voltage feedback module 300 is thus needed to pump in energy in the power sustaining device 119 in time and to sustain the operating voltage and ensure no flickering occurred when operating the LLT lamp. Once the driver 400 is operated, it extracts partial power from the output voltage to pour into the power sustaining device 119 to maintain its operation while the first low DC voltage from the one or more start-up resistors 104 continuously applies to the power sustaining device 119. In this sense, the power sustaining device 119 receives power from not only the one or more start-up resistors 104 but also the voltage feedback module 300. When an electric shock hazard occurs, cutting off only the first low DC voltage from the one or more start-up resistors 104 cannot guarantee that the driver 400 is turned off. Once the driver 400 is operated, the electric shock current will unavoidably leak out. Therefore, the electrical jumper pair 109 must be connected between the power sustaining device 119 and the driver 400 to shut off the driver 400 by cutting off an electrical connection between the power sustaining device 119 and the driver 400. When the switch 201 is off, the diode 202 is forward-biased, and the inductor 203 discharges with a loop current flowing from the one or more LED arrays 214, the diode 202, the current sensing resistor 107, back to the inductor 203. The current sensing resistor 107 keeps track of the output current and feedbacks to the PFC and control device 103 to further control the switch 201 on and off. The closed loop operation in both on-time and off-time of the switch 201 ensures the output current to be accurately controlled within 4%.

Figure 3:
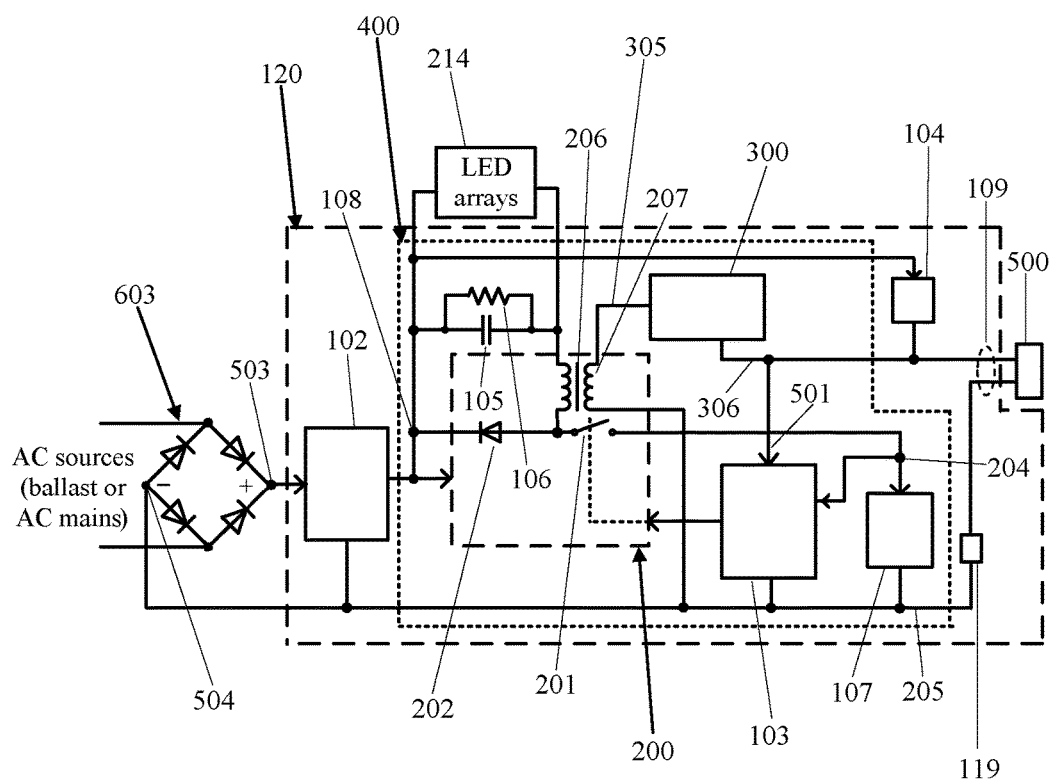
FIG. 3 is another embodiment of an LED driving circuit used in an LLT lamp operable with either the AC mains or ballasts according to the present disclosure.

FIG. 3 is another embodiment of an LED driving circuit used in an LLT lamp operable with either the AC mains or the ballasts according to the present disclosure. An LED driving circuit 120 in FIG. 3 has all the components as the LED driving circuit 110 in FIG. 2, except that interconnections are different, and a transformer 206 in FIG. 3 replaces the center-tapped inductor 203 in FIG. 2. In FIG. 3, the same numerals are used for the same components as in FIG. 2. In FIG. 3, the LED driving circuit 120, connecting to the full-wave rectifier 603, comprises an input filter 102, one or more start-up resistors 104, a driver 400, an electrical jumper pair 109 connecting between the power sustaining device 119 and the driver 400 with a terminal module 500 outside the LED driving circuit 120. The driver 400 comprises a PFC and control device 103, a Buck converter 200 in communicating with the PFC and control device 103, an output capacitor 105 in parallel with a resistor 106 connected to the Buck converter 200 to build up an output voltage and to power the one or more LED arrays 214, a current sensing resistor 107, and a voltage feedback module 300 extracting partial energy from the output voltage to sustain the PFC and control device 103. The terminal module 500 comprises the first pair of electrical contacts 301 and 302 and the second pairs of electrical contacts 303 and 304 interconnected in series, as depicted in FIG. 1. Either one of the two pairs of electrical contacts not electrically connected renders an electrical disconnection between the power sustaining device 119 and the driver 400. Once the driver 400 is operated, it extracts partial power from the output voltage to pour into the power sustaining device 119 to maintain its operation while the first low DC voltage from the one or more start-up resistors 104 continuously applies to the power sustaining device 119. In other words, the power sustaining device 119 receives power from not only the one or more start-up resistors 104 but also the voltage feedback module 300. When an electric shock hazard occurs, cutting off only the first low DC voltage from the one or more start-up resistors 104 cannot guarantee that the driver 400 is turned off. Once the driver 400 is operated, the electric shock current will unavoidably leak out. Therefore, the electrical jumper pair 109 must be connected between the power sustaining device 119 and the driver 400 to shut off the driver 400 by cutting off an electrical connection between the power sustaining device 119 and the driver 400. In FIG. 3, the driver 400 has a high voltage input port 108 and a low voltage input port 501. When the power is on, the high voltage input port 108 of the driver 400 receives an input current via the input filter 102, and the switch 201 controlled by the PFC and control device 103 is ready to be turned on to control the Buck converter 200. However, when the terminal module 500 is off, the low voltage input port 501 loses a connection between the power sustaining device 119 and the driver 400, meaning that the PFC and control device 103 is not yet operated. Only when the first pair of electrical contacts 301 and 302 and the second pairs of electrical contacts 303 and 304 in the terminal module 500 are individually connected, can the switch 201 be controlled to turn on or off. When the switch 201 is on, the diode 202 is reverse-biased, and the input current goes from the resistor 106, a primary side of the transformer 206, the switch 201, and the current sensing resistor 107 to the common ground 504, completing an AC cycle. When the input current goes into the primary side of the transformer 206, energy is stored in it. The PFC and control device 103 detects the input voltage level and control the switch 201 on and off in a way that a desired output voltage $V_o$ across the one or more LED arrays 214 is reached to light up the one or more LED arrays 214. When the switch 201 is off, the diode 202 is forward-biased, and the primary side of the transformer 206 releases the energy stored, resulting in a loop current flowing from the diode 202 and the one or more LED arrays 214, back to the primary side of the transformer 206, completing the energy transfer to the one or more LED arrays 214. When the switch 201 is on, the input current flows into the one or more LED arrays 214, the primary side of the transformer 206, the switch 201, and the current sensing resistor 107, creating a voltage drop across the current sensing resistor 107. The voltage appearing at the port 204 of the current sensing resistor 107 inputs to the PFC and control device 103 to control the off-time of the switch 201. The voltage feedback module 300 has two connection ports 305 and 306, with the first connection port 305 connecting to a high side of a secondary winding 207 in the transformer 206 and with the second connection port 306 connecting to the PFC and control device 103. The voltage feedback module 300 continuously monitors the output voltage by using the secondary winding 207 in the transformer 206. When the voltage at the high side of the secondary winding 207 is higher than a becoming lower operating voltage in the PFC and control device 103 due to increased internal operations, the diode (not shown) in the voltage feedback module 300 conducts to supply energy in time through the second connection port 306 to sustain the operating voltage in the PFC and control device 103.

Figure 4:
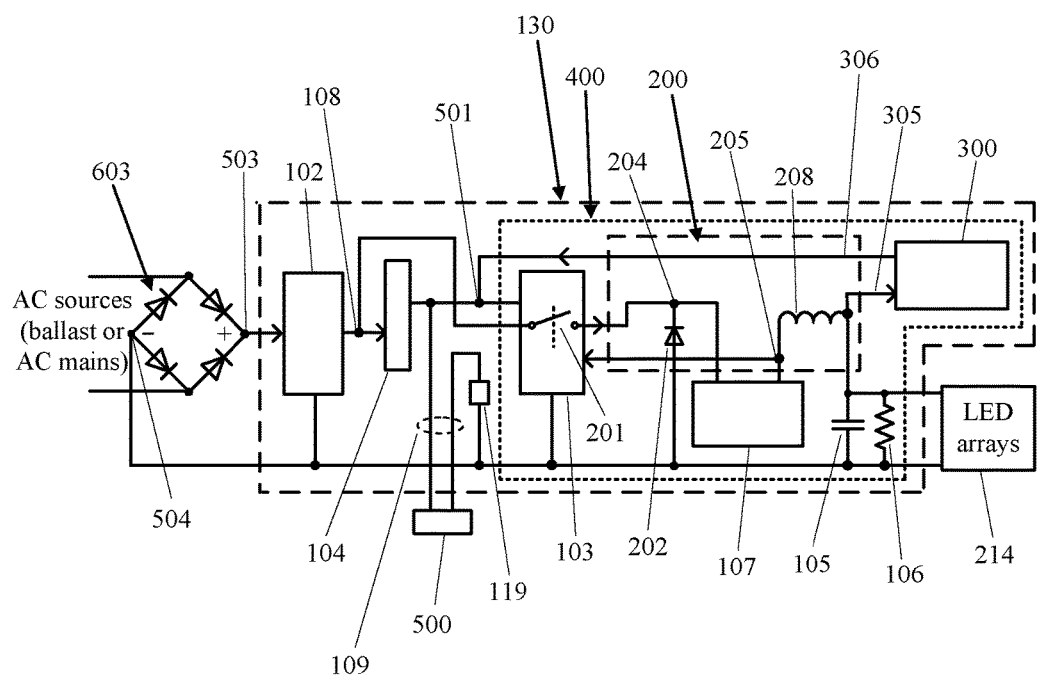
FIG. 4 is another embodiment of an LED driving circuit similar to FIG. 2 according to the present disclosure.

FIG. 4 is another embodiment of an LED driving circuit similar to FIG. 2 according to the present disclosure. An LED driving circuit 130 in FIG. 4 has all the components as the LED driving circuit 110 in FIG. 2, except that the switch 201 is integrated in the PFC and control device 103, and an inductor 208 in FIG. 4 replaces the center-tapped inductor 203 in FIG. 2. In FIG. 4, the same numerals are used for the same components as in FIG. 2. Similar to FIG. 2, a full-wave rectifier 603 connecting to an AC source, either the AC mains or the ballast, converts an AC voltage into a DC voltage. An LED driving circuit 130, connecting to the full-wave rectifier 603, comprises an input filter 102 used to filter the input voltage and to suppress EMI noise created in the LED driving circuit 130, one or more start-up resistors 104, a power sustaining device 119, a driver 400, an electrical jumper pair 109 connecting between the power sustaining device 119 and the driver 400 with a terminal module 500 outside the LED driving circuit 130. The driver 400 comprises a power factor correction (PFC) and control device 103 comprising an internal logic control circuit (not shown) and the switch 201 controlled by the internal logic control circuit, a Buck converter 200 in communicating with the PFC and control device 103, an output capacitor 105 in parallel with a resistor 106 connected to the Buck converter 200 to build up an output voltage and to power the one or more LED arrays 214, a current sensing resistor 107, and a voltage feedback module 300 extracting partial energy from the output voltage to sustain the PFC and control device 103. The driver 400 has a high voltage input port 108 and a low voltage input port 501. The terminal module 500 comprises the first pair of electrical contacts 301 and 302 and the second pair of electrical contacts 303 and 304 interconnected in series, as depicted in FIG. 1. Either one of the two pairs of electrical contacts not electrically connected results in a missing connection between the power sustaining device 119 and the low voltage input port 501. The power sustaining device 119 is configured to provide a low DC voltage operating the PFC and control device 103. When such a missing connection occurs, the PFC and control device 103 does not work, neither the driver 400. The full-wave rectifier 603 has four input/output ports, among which a high electric potential appears at the input/output port 503 as V+, and a low electric potential appears at the input/output port 504 as V−, respectively connecting to the high side and the low side of the input filter 102 with the low electric potential port 504 as a common ground. The Buck converter 200 comprises a diode 202 and an inductor 208 with its current charging and discharging controlled by the switch 201 integrated in the PFC and control device 103. When both two pairs of electrical contacts in the terminal module 500 are individually connected, the electrical jumper pair 109 connecting to the terminal module 500 conducts so that the low DC voltage from the power sustaining device 119 applies to the PFC and control device 103 to sustain its operation. Then the driver 400 can detect zero current in the inductor 208 within an AC cycle of an input voltage generating a zero current detection signal and controls the switch 201 on and off with a constant on-time and a varied off-time controlled by the zero current detection signal. By adapting switching frequencies for a high frequency associated with a ballast and a low frequency associated with the AC mains, the PFC and control device 103 controls the switch 201 on and off in a way that the inductor 208 is charged during on-time and discharged during off-time, and that a desired output voltage $V_o$ across the one or more LED arrays 214 is reached to light up the one or more LED arrays 214. The average inductor current is thus equal to the output current that flows into the LED array 214. When the switch 201 is on, the diode 202 is reverse-biased, and an input current flows from an output port 108 in the input filter 102, the switch 201, the first port 204 of the current sensing resistor 107, the current sensing resistor 107 itself, and the second port 205 of the current sensing resistor 107, into the inductor 208. When the current flowing into the inductor 208 increases, the voltage across the current sensing resistor 107 increases. The second port 205 of the current sensing resistor 107 connects with the PFC and control device 103, which continuously receives signals and adjusts the off-time such that the output voltage and current to the one or more LED arrays 214 are regulated to meet the output requirements. The output capacitor 105 in parallel with the resistor 106 connects to the inductor 208, receiving energy to build up an output voltage and to power the one or more LED arrays 214.

In FIG. 4, the voltage feedback module 300 has two connection ports 305 and 306, with the first connection port 305 connecting to the inductor 208 and with the second connection port 306 connecting to the PFC and control device 103. The PFC and control device 103 is powered by the power sustaining device 119 with a voltage built up to supply the internal logic control circuit (not shown) in the PFC and control device 103. When the voltage decreases due to its increased internal operations and controls, and when the voltage of the inductor 208 is higher than the supplying voltage, the diode in the voltage feedback module 300 conducts to supply a current to the PFC and control device 103 and sustain its operations. The function of the voltage feedback module 300 is essential to operate the LED driving circuit 130 and the one or more LED arrays 214 without flickering. When the switch 201 is off, the diode 202 is forward-biased, and the inductor 208 discharges with a loop current flowing from the one or more LED arrays 214, the diode 202, the current sensing resistor 107, back to the inductor 208. The current sensing resistor 107 keeps track of the output current and feedbacks to the PFC and control device 103 to further control the switch 201 on and off.

In FIGS. 1-4, the low DC voltage are used to control the through-lamp electric shock current flowing out from the LED driving circuit and the one or more LED arrays to reduce a risk of electric shock. The low DC voltage used to operate the at least one pair of electrical contacts in two lamp bases meets voltage requirements of a Class 2 circuit, which is considered safe from a fire initiation viewpoint and provides an acceptable level of protection from electrical shock. The use of such a low DC voltage in controlling electrical contacts to be on or off has one of unique advantages. That is, no matter whether AC sources is AC mains from an electrical grid or power supplies from various ballasts, no electric arc can occur due to a low current associated with the low voltage. In other words, an internal arcing and firing will never occur using this approach, thus eliminating any internal fire hazard and enhancing operation reliability.

Whereas preferred embodiments of the present disclosure have been shown and described, it will be realized that alterations, modifications, and improvements may be made thereto without departing from the scope of the following claims. Another kind of the electric shock and internal fire prevention schemes in an LED-based lamp using various kinds of combinations to accomplish the same or different objectives could be easily adapted for use from the present disclosure. Accordingly, the foregoing descriptions and attached drawings are by way of example only, and are not intended to be limiting.

What is claimed is:

1. A linear light-emitting diode (LED) tube lamp, comprising:
    a housing having two ends;
    two lamp bases respectively connected to the two ends of the housing, each lamp base comprising a displacement sensor, at least one pair of electrical contacts controlled by the displacement sensor, and at least one electrical conductor configured to connect to a lamp fixture socket that is wired to connect to either alternate current (AC) mains or ballasts;
    a full-wave rectifier connected to the at least one electrical conductor in each lamp base and configured to convert an input AC voltage of either the AC mains or the ballasts into a direct current (DC) voltage;
    at least one LED printed circuit board (LED PCB) disposed between the two ends of the housing;
    one or more LED arrays disposed on the at least one LED PCB; and
    an LED driving circuit comprising an input filter, a power sustaining device, a driver comprising a voltage feedback module and a low voltage input, one or more start-up resistors connected with the voltage feedback module, and an electrical jumper pair, the one or more start-up resistors and the voltage feedback module configured to provide a low DC voltage to couple to the power sustaining device via the electrical jumper pair and to sustain operation of the LED driving circuit;
    wherein:
        the at least one pair of electrical contacts in each of the two lamp bases are connected in series and further connected to the electrical jumper pair so as to loop between the power sustaining device and the low voltage input of the driver;

when either one of the at least one pair of electrical contacts is not electrically connected, a through-lamp electric shock current does not flow out of the one or more LED arrays;

when one of the at least one electrical conductor in one of the two lamp bases is inserted into the respective lamp fixture socket while the other one of the at least one electrical conductor in the other one of the two lamp bases is removed from the respective lamp fixture socket and touches an electrically-conductive object, the LED driving circuit stops to operate without delay, free of electric shock current flowing to the electrically-conductive object, and free of electric arc generated on the respective one pair of electrical contacts; and when the at least one electrical conductor in each of the two lamp bases is inserted into the lamp fixture socket, the at least one pair of electrical contacts are actuated by the displacement sensor in each lamp base to deliver the low DC voltage from the power sustaining device to the driver, thereby operating the driver and powering the one or more LED arrays.

2. The linear LED tube lamp of claim 1, wherein the driver further comprises a high voltage input configured to receive a filtered DC voltage from the input filter, a power factor correction (PFC) and control device, a switch controlled by the PFC and control device, a current sensing resistor, a diode, an inductor with current charging and discharging controlled by the switch, a resistor, and an output capacitor in parallel with the resistor and connected to the inductor to build up an output voltage and to power the one or more LED arrays, wherein the voltage feedback module is coupled to draw partial power from the output voltage to sustain an operation of the PFC and control device, and wherein, responsive to detecting zero current in the inductor within an AC cycle of the input voltage, the PFC and control device generates a zero current detection signal to control the switch turning on and off.

3. The linear LED tube lamp of claim 2, wherein the inductor in the driver is of an autotransformer type.

4. The linear LED tube lamp of claim 2, wherein the inductor in the driver is part of a transformer.

5. The linear LED tube lamp of claim 2, wherein the PFC and control device operates in a range approximately between 11 V and 35 VDC.

6. The linear LED tube lamp of claim 1, wherein the low DC voltage meets voltage requirements of a Class 2 circuit.

7. The linear LED tube lamp of claim 1, wherein the voltage feedback module comprises a diode configured to control a current flow.

8. The linear LED tube lamp of claim 1, wherein the driver further comprises a high voltage input configured to receive a filtered DC voltage from the input filter, a power factor correction (PFC) and control device comprising an internal logic control circuit and a switch controlled by the internal logic control circuit, a current sensing resistor, a diode, an inductor with current charging and discharging controlled by the switch, a resistor, and an output capacitor in parallel with the resistor and connected to the inductor to build up an output voltage and to power the one or more LED arrays, wherein the voltage feedback module is coupled to draw partial power from the output voltage to sustain an operation of the PFC and control device, and wherein, responsive to detecting zero current in the inductor within an AC cycle of the input voltage, the PFC and control device generates a zero current detection signal to control the switch turning on and off.

* * * * *